United States Patent [19]
Graham

[11] 3,797,479
[45] Mar. 19, 1974

[54] SPIROMETER
[75] Inventor: Martin H. Graham, Berkeley, Calif.
[73] Assignee: Comprehensive Health Testing Laboratories, Inc., San Francisco, Calif.
[22] Filed: Apr. 14, 1972
[21] Appl. No.: 244,202

[52] U.S. Cl. .............................. 128/2.08, 73/205 L
[51] Int. Cl. .............................................. A61b 5/08
[58] Field of Search ...................... 128/2.08, 2.05 F; 73/205 L

[56] References Cited
UNITED STATES PATENTS
| 3,626,755 | 12/1971 | Rudolph ............................ 73/205 L |
| 3,504,542 | 4/1970 | Blevins ................................ 73/205 |
| 3,621,835 | 11/1971 | Suzuki et al. ....................... 128/2.08 |
| 3,577,984 | 5/1971 | Levy et al. .......................... 128/2.08 |
| 3,606,883 | 9/1971 | Poirier et al. ....................... 128/2.08 |
| 3,608,546 | 9/1971 | Shinn .................................. 128/2.08 |
| 3,645,133 | 2/1972 | Simeth et al. ........................ 73/204 |
| 3,433,217 | 3/1969 | Rieke .................................. 128/2.08 |

FOREIGN PATENTS OR APPLICATIONS
1,508,303 11/1967 France .............................. 128/2.08

Primary Examiner—Kyle L. Howell

[57] ABSTRACT

A spirometer including improved pneumotach and electronic circuitry for obtaining normalized linear output measuring forced vital capacity and maximum expiration flow rate with automatic zeroing feature before test. Display means are included to provide the patient with an immediate indication during a test of the patient's rating compared to normal. Automatic zeroing circuitry and a starting circuit responsive to initial exhalation are also included.

4 Claims, 5 Drawing Figures 3,797,479

SPIROMETER

BACKGROUND OF THE INVENTION

This invention relates to spirometers as used in the rapid measurement of physical function in the screening of patients for pulmonary defects, particularly in the measurement of forced vital capacity and maximum expiration flow rate.

Heretofore, various spirometers have been available for measuring maximum forced vital capacity and maximum expiration flow rate; however, such devices have required substantial calculations to be performed in order to obtain data converted into normalized form to account for difference in patient's age, size and sex. This limitation prevents patient involvement since his relative performance is not indicated until completion of the computations and renders prior spirometers less than suitable for rapid screening of patients such as in multiphasic examinations, where the time consumed in making calculations should be eliminated. In addition, prior spirometers have had limited accuracy because of undue sensitivity to reference level drift before test and nonuniformity of flow patterns in the breath receiving means, hereafter called pneumotach. There is therefore a need for a new and improved spirometer.

SUMMARY OF THE INVENTION AND OBJECTS

It is a general object of the present invention to provide a new and improved spirometer which will overcome the above limitations.

It is a further object of the invention to provide an improved spirometer which incorporates medically recognized normalization functions within its constructions by which meter visable readouts normalized for the values of age, sex and size of the patient are given, responsive to such values being entered by the operator into the apparatus so that the operator and the patient have an immediate indication during a test of the patient's rating compared to normal.

Another object of the invention is to provide a new and improved spirometer of the above character which also provides recording outputs for absolute values of the instantaneous computed flow and volume which can be connected to conventional XY recorder or storage oscilloscope to directly display a flow-volume loop.

A further object of the invention is to provide a spirometer of the above character in which the pneumotach or breath tube is constructed to give accurate and reproducible results, particularly with reference to eliminating patient induced asymmetric breathing patterns by establishing substantially uniform flow field therein.

Another object of the invention is to provide a spirometer of the above character having electrical processing circuitry which is applicable to a wide and variety of uses including mass patient screening, as in multiphasic examinations, and which provides rapid and simple [hysteresis-free] screening of restricted obstructive pulmonary diseases in a wide variety of applications.

In general, the foregoing objects are achieved by providing an improved spirometer having a pneumotach adapted to the placed in the patient's mouth and serving to develop an electrical signal indicative of the passage of the breath exhaled by the patient. The pneumotach is specially designed for minimizing inaccuracies caused by non-axially directed components in the flow by incorporating a flow stabilizing screen between the flow measuring portion of the pneumotach and a mouthpiece. A non-linear amplifier is provided for modifying the signal developed from the pneumotach to provide an electrical signal which is linearly related to the flow therein. A normalizing circuit modifies the linear electrical flow signal and developes a normalized signal based on the size, age, and sex of the patient, so that subsequently developed values of electrical signals indicative of maximum expiration flow rate and forced vital capacity are ratioed with the expected maximum flow rate and forced vital capacity for persons of similar size, age and sex.

These normalized flow values are sensed by appropriate circuitry for developing peaked normalized flow, and for integrating the entire flow over the predetermined time intervals to develop incremental volume memory signals and a normalized maximum volume.

The entire instrument is made self-starting and self-timing being started by the initial exhalation of the patient. In addition, an automatic zeroing circuit is utilized to compensate against drift and for maintaining the input reference level at zero up to the point of the beginning of the test as automatically started by the patient. The same zeroing circuit remains at its last value so as to hold the zeroing value into the input during the entire period of the test.

These and other features of the invention will become apparent from the following description, when taken into conjunction with the following drawings.

DETAILED DESCRIPTION OF THE PREFERRED EMBODIMENT

Figure 1:
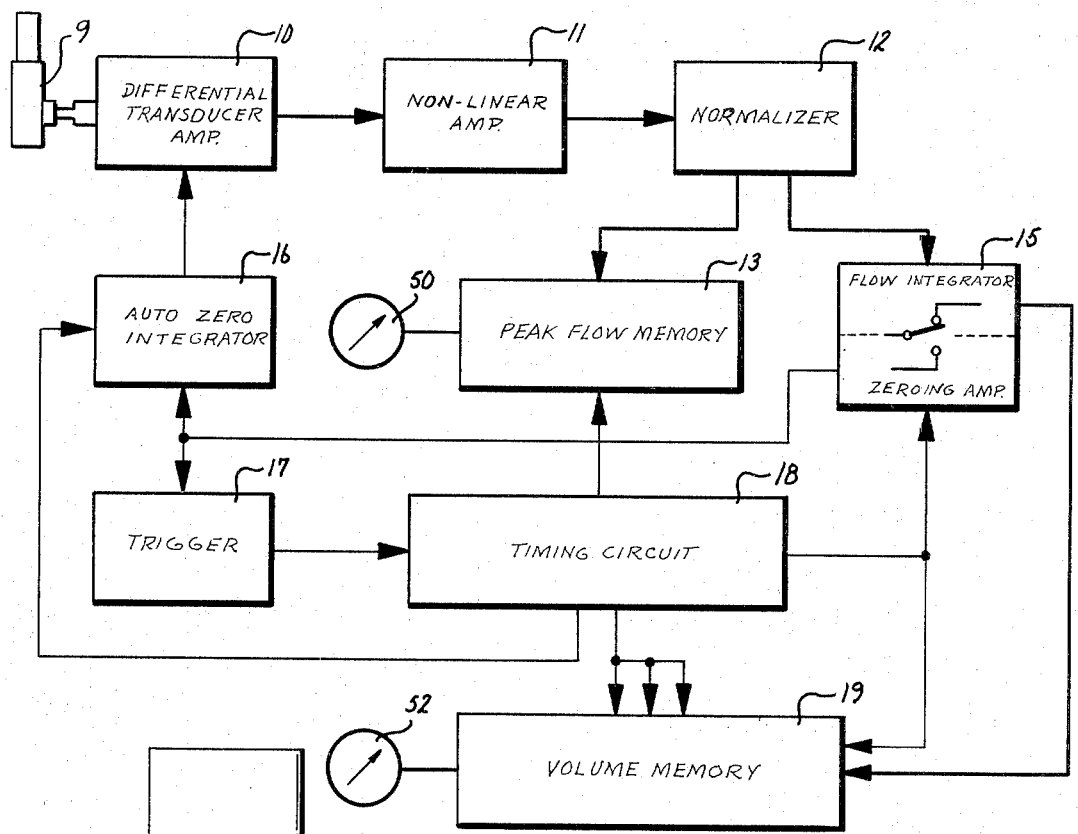
FIG. 1 is a schematic block diagram of a spirometer constructed in accordance with the present invention.

The spirometer of the present invention generally includes a gas flow measuring device 9, for receiving the expiration of a patient and generally known as a pneumotach, having an output which is developed into an electrical signal and is processed by suitable electronic circuitry, generally indicated by reference numerals 10 through 19. The function and structure of each of the elements will now be given in detail.

Figure 2:
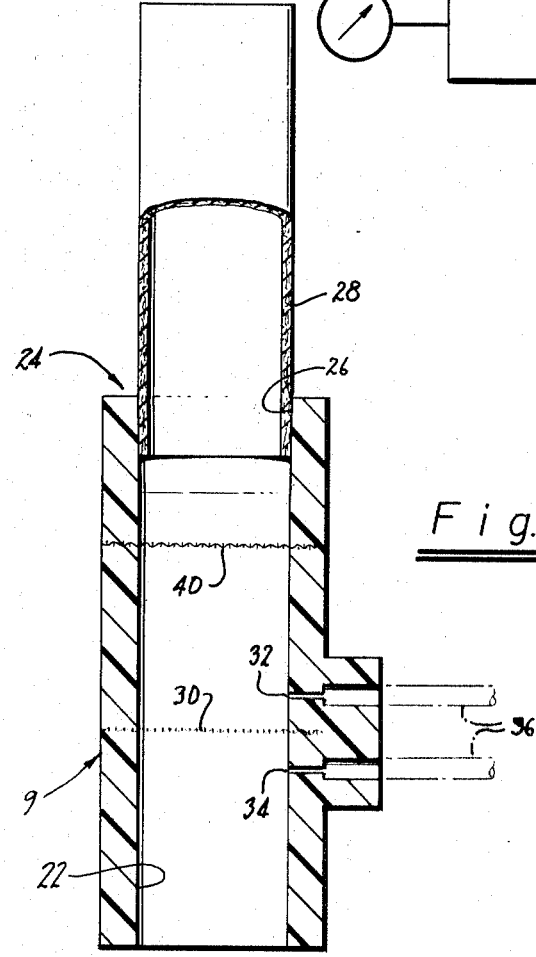
FIG. 2 is a cross-section view of pneumotach portion of the spirometer of FIG. 1.

FIG. 2 shows the structure of the pneumotach 9 in detail. Thus, there is provided an elongated tube having a flow passageway 22 therethrough, having a cross-section and are suitable for use by a patient. Generally both ease of manufacture and adaptability to the mouth indicate that a passageway of uniform circular cross-section is satisfactory. One end 24 of the tube is provided with a slightly tapering inner surface 26 adapted to receive a mouthpiece 28, which is perferably made of a disposable cardboard, having a non-wetable plastic exterior. A screen 30 is disposed within the tube and across the extent of the flow passage for creating a pressure drop roughly proportional to the flow through the tube. Means is provided for sensing the pressure drop and includes means for forming orifice passages 32, 34 on each side of the screen and in communication with the flow passage within the tube, which serves to provide support for a flexible tubing pair 36 by which the pneumotach is connected to the input of electrical processing circuitry 10 including a differential pressure transducer 38 for developing an electrical signal proportional to the measured pressure difference between orifice 32, 34.

A flow stabilizing screen 40 is disposed in the flow passage between the pressure difference developing screen 30 and the mouthpiece 28 and serves to establish a more uniform flow field across the area of the flow passage particularly in the region of the pressure difference developing screen. This is a result of the slight pressure drop appearing at the flow stabilizing screen 40 by which non-uniformities in flow due to non-axially directed components of the patient's breath are dispersed and equalized before proceeding to the region of screen 30. By incorporating the second screen 40, the pneumotach of the present invention is able to achieve a significant improvement in accuracy and reproducibility.

Figure 3A:
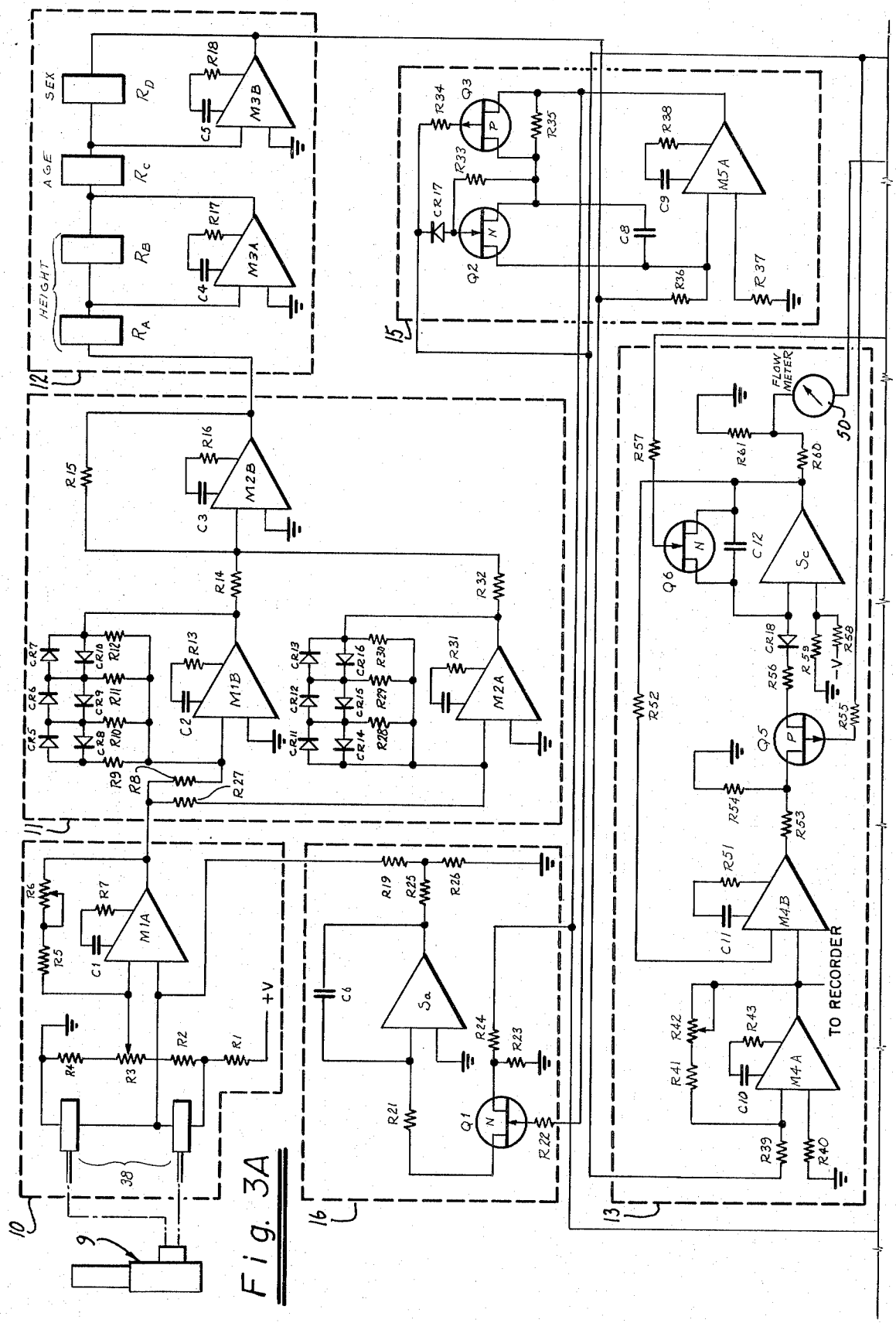
FIGS. 3A and 3B are detailed electrical schematic diagrams of the signal processing circuitry of the spirometer of FIG. 1.
Figure 3B:
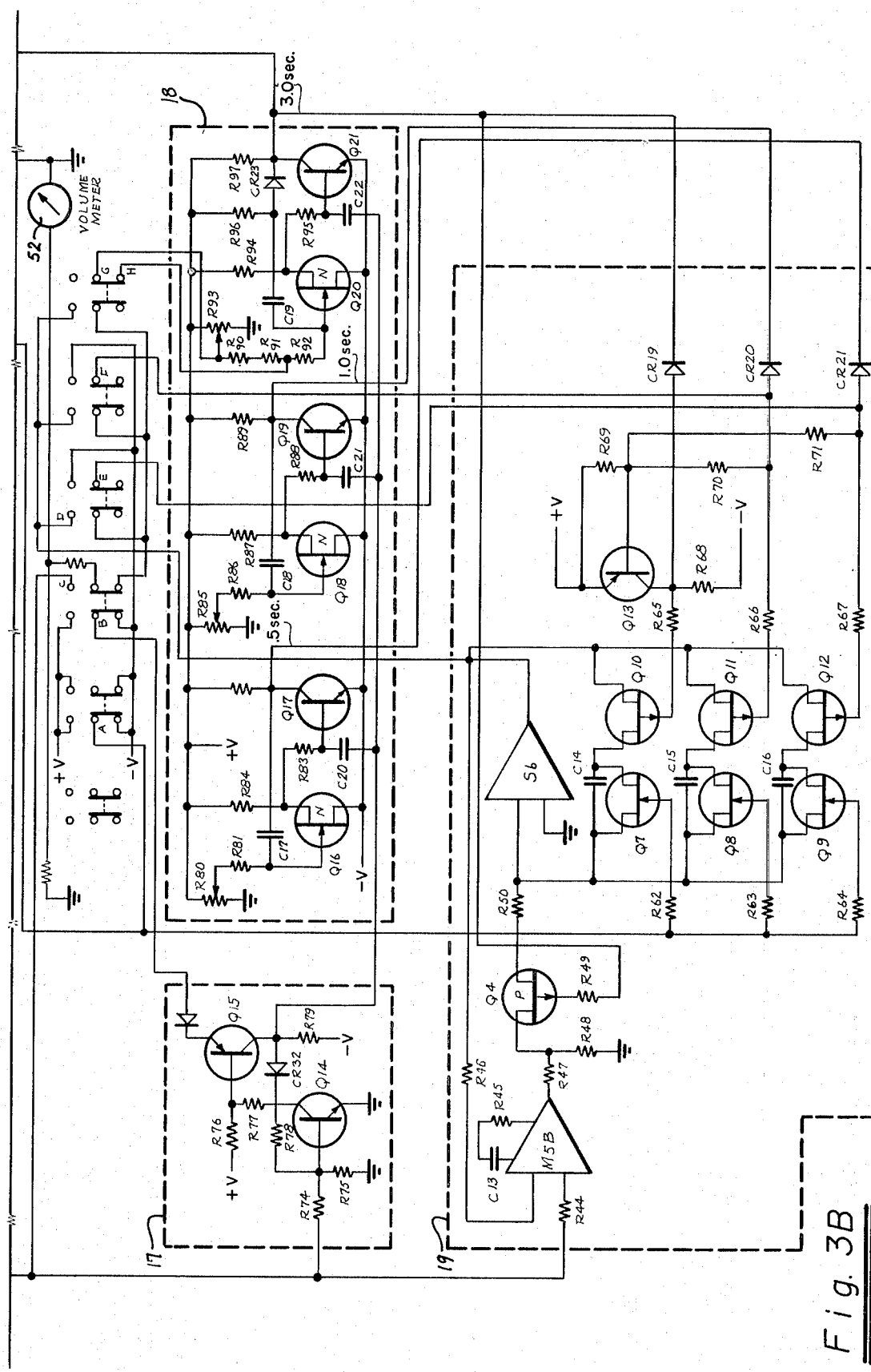
Figure 4:
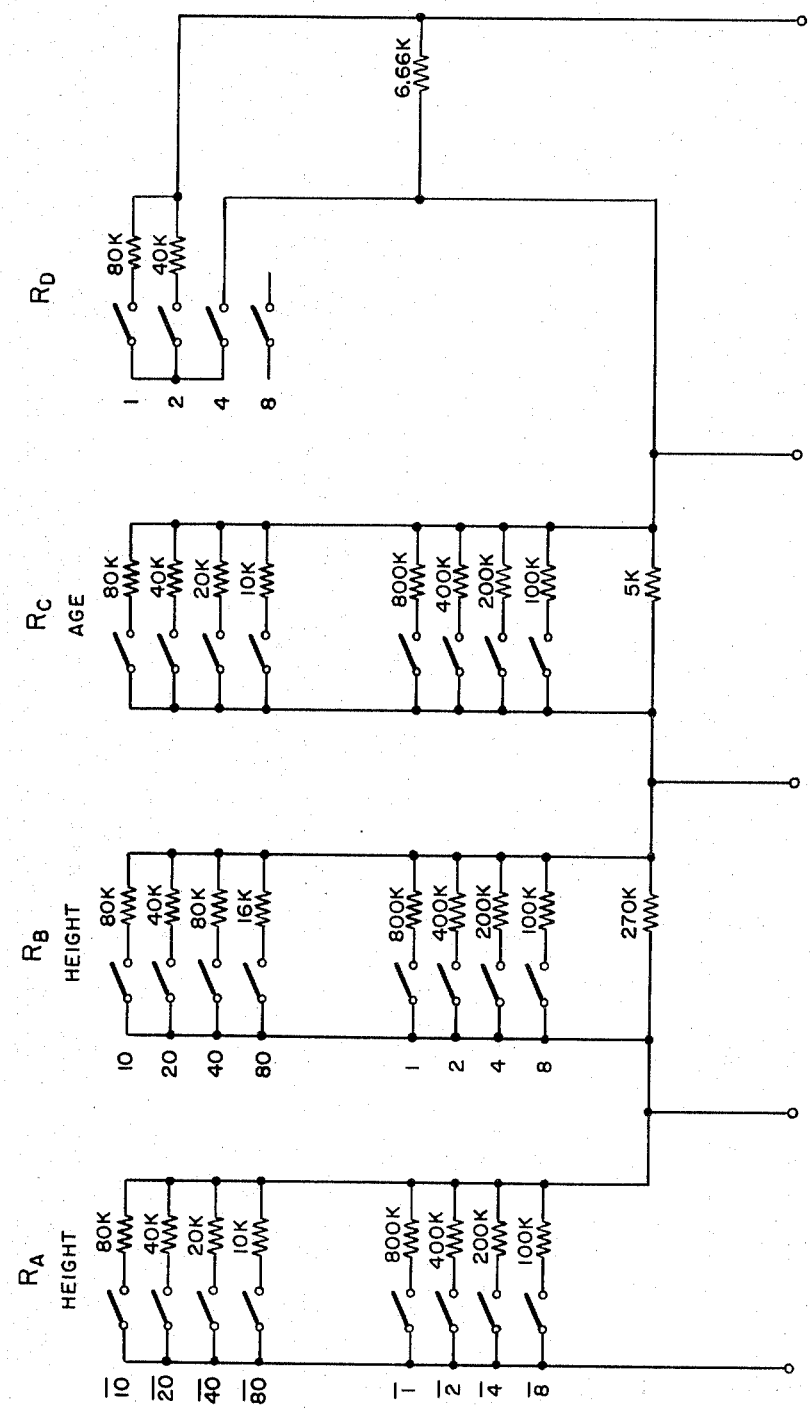
FIG. 4 is a detailed schematic diagram of a portion of a normalizing circuit of the signal processing circuitry of FIG. 3.

Referring now more particularly to FIGS. 1, 3 & 4, the electrical processing circuitry of the present invention generally includes input bridge circuit incorporating of differential pressure transducer 38. The pressure transducer bridge is connected across the input of a differential operational amplifier M1, which provides linear amplification of the input signal and includes feedback circuit consisting of resistors R5 and adjustable resistor R6 which serve to stabilize the gain of amplifier M1A. The output of amplifier M1A is delivered to a non-linear amplifier 11. Since the pressure drop across the pneumotach is a nonlinear function, it is desirable to convert the transducer output into a linear signal. Thus, the output is split between two operational amplifiers M1B and M2A, each of which contains a feedback loop including a plurality of diodes and resistances which determine a compensatory nonlinear function such that the output thereof is linear. After being combined through resistances R14 and R32 and passed through operational amplifier which serves to isolate nonlinear amplifier section 11 modifies the electrical signal from the differential pressure measuring and amplifying circuit, and developes a second electrical signal which is linearly related to the actual flow through the pneumotach.

This linear flow signal is then processed through a normalizing circuit 12, which develops a normalized flow signal compensated for the size, age and sex of the patient such that subsequently developed values of the electrical signal indicative of the maximum expiration flow rate and the forced vital capacity of the patient are ratioed with the expected maximum flow rate and expected forced vital capacity. The normalizing circuit includes amplifiers M3A and M3B, the gain and performance of which are adjusted by varing the input and loop feedback resistances $R_A$, $R_B$, $R_C$ and $R_D$ to compensation in accordance with medically recognized normalization functions. Resistances $R_A$, $R_B$, $R_C$ and $R_D$ are variable as shown in FIG. 4, and are operated by a thumbwheel switch so that the values of age, sex and size can be entered by the operator (into the spirometer). As so normalized, both the operator and the patient obtain an immediate indication during a test of the patient's rating compared to normal. Both the forced vital capacity and maximum expiration flow rate are found to vary in accordance with the foregoing parameters in similar manner so that it is acceptable to vary a single set of resistance values to modify the flow rate signal and to draw therefrom normalized values of both the maximum flow rate and vital capacity.

Referring more specifically to the connection diagram for the resistances $R_A$ through $R_D$, FIG. 4, $R_A$ and $R_B$ comprise a plurality of resistors which are varied in combination in accordance with a binary coded switch having tens and units values. When so adjusted for the height of the patient, as an indication of the patient's size, the input resistance to amplifier M3A as well as the feedback loop resistance are modified in accordance with the formula $$165 - H/H - 27$$

where $H$ is the height of the patient in inches.

The input resistance to amplifier M3B is determined by resistance group $R_C$ which is also connected to a binary coded switch having 10s and units values ranging from zero to 99, indicative of the age of the patient. The feedback loop of M3B contains a variable resistance group $R_D$ for entering the patient's sex. Accordingly, the output of the normalizing circuit 12 is modified in accordance with the parameters mentioned and the resultant flow rate information can be integrated to determine maximum forced vital capacity referenced to that of a normal person and indicated on a suitable meter in units of per cent of normal. Likewise, the peak flow rate can also be sensed and read on a second meter in terms of percentage of normal as will be hereinafter described.

To accomplish the foregoing, the output of the normalizing circuit 12 is divided, one portion being passed to a peak flow sensing and memory circuit 13 having an output meter 50 as described. The other portion of the normalized flow rate signal is passed through a flow rate integrator 15 to develop an instantaneous summing of flow rate or total instantaneous volume and is delivered to a volume and memory circuit 19 for storage, the total volume as a function of specific time intervals of interest, which can then be selectively read out on a volume output meter 52.

Referring now to the detailed circuit schematic of the flow integrator 15, of the present invention not only provides an integration function, but also contains an auxiliary zeroing circuit 16 which serves to automatically maintain the instrument at zero reference level immediately prior to the patient's test. As shown in detail, the flow integrator consists of an operational amplifier M5A, connected to receive the output of the normalizing circuit 12 through resistance R36. Amplifier M5A is connected in one of two modes; the first mode being that of an integrator through closed FET Q3 and capacitor C8, Q3 bypassing resistor R35.

The second mode is that of an amplifier in which the capacitor C8 is bypassed by FET transistor Q2 and R35 is connected into the feedback loop by opening Q3. In this mode, the flow integrator 15 is connected as a high gain amplifier to drive auto-zeroing circuit 16 after reset of the instrument and during the period preceeding the test of the patient. This same output is also used to drive trigger circuit 17 response to the patient's initial expiration to start circuit to begin and the testing functions of the instrument in accordance with timing pulses of a half second, one second and three seconds, as developed in a timer. The timing circuits and the way in which the instrument is automatically switched from a ready mode to operate mode will now be explained. Assume that the reset switch has been actuated and the instrument is in the ready mode, the test function switch having been actuated. In this mode FET Q3 is open while FET Q2 is closed, such that capacitor C8 is shorted and resistance R35 appears in the feedback loop of amplifier M5A and forms the same into a high gain amplifier the output of which is delivered through FET Q1, normally closed, to the input of an integrator Sa the output of which is applied through resistance R19 to the input of the differential measuring amplifier M1A. Since Q1 is closed, an unbalanced or non-zero signal appearing at the output of M5A is applied to integrating amplifier Sa to thereby readjust the input signal appearing one side of the differential amplifier M1A so that the net response voltage appearing at the output of M1A is such that the draft of the integrator is zero. As just described the auto-zeroing circuit has a first state for developing a varying compensating signal for maintaining the output differential pressure measuring circuit at zero level. The auto-zeroing circuit transistors, Q1, Q2 and Q3 are all switchable responsive to an external starting signal from the timing circuit 18 to change from conductive to nonconductive state or vice versa. Thus upon receipt of a starting signal (3 see timing signal) transistor Q1 is flipped into a nonconductive state. In this second state, the input signal to operational amplifier Sa is cut off and the last remaining value appearing on the integrating capacitor C6 is held so that the last value required to maintain zero reference level is held during the subsequent test. Simultaneously, Q2 is opened to thereby place C8 into the circuit and Q3 is closed to take resistor R35 out of the feedback loop of flow integrating amplifier M5A.

In order to provide a self-timing and self-starting instrument, the initial start of the expiration of the patient is detected. Before the patient starts to exhale, the entire instrument is in the automatic zeroing mode as with amplifier M5A being connected as a high gain amplifier. The output of amplifier M5A appears at the input of trigger circuit 17 consisting of a flip-flop made up of transistors stages Q14 and Q15. This circuit is set to the zero state when the reset button is pressed by opening the connection to the positive voltage as indicated in the switching circuit. When connected again to the positive voltage by the test switch, the flip-flop is ready to be set into the one state and is driven to the one state when a positive signal is applied to the trigger circuit through R74 at the base of Q14. Thus, when a patient initially blows into the pneumotach, the positive signal which is developed at the output of amplifier M5A trips the flip-flop of trigger 17 to the other state and delivers an output through condensers C20, C21 and C22 to start timing circuits in timer 18. The three second timing pulse is applied to several of the other circuits to thereby change the instrument from the ready mode to test mode of operation, and to stop the instrument after completion of that interval. Thus, the leading edge is applied to the base of Q1, Q2, and Q3 to open and close these switches as described; and also to the base of Q5 in the peak flow memory circuit and Q4 in the volume memory circuit to cause Q4 and Q5 to conduct, whereby each memory becomes operational in response to applied input signal. In this way, the output of trigger 17 begins the start of each of the timing pulses and controls the test operation of the instrument. Since the trigger 17 is bistable, no further responses from the pneumotach can cause a second timing cycle to occur because the trigger will remain in the one state until reset to the zero state by pressing the reset switch. This serves as a locking mechanism interconnected with the operating switches so that one and only one test can be performed for each time the reset and test switches are closed.

Referring now to timig circuit 18, which consists of three timing stages, each of which is of a similar design consisting of an npn transistor connected with collector-to-base feedback through a timing circuit including field effect transistors Q16, Q18 and Q20, respectively, which permit the use of small transistor base currents and large resistances with roughly one second time intervals without the need for excessively large capacitors. The capacitors C17, C18 and C19 determine the respective recovery time of each of the timing circuits. Each of the base-to-supply voltage resistances R80, R85, and R93 is adjustable in order to allow fine adjustment of the timing interval. In order to provide for rapid rise times on the leading and trailing edges of the 3 second pulse and thereby obtaining precise control of the start test and stop test function of remainder of the circuitry, a separate recharging circuit is provided in the 3 second timer and includes resistor R95 and diode CR23. Together these elements isolate the collector of transistor 21 from the recharging requirements of capacitor C19 and permit the collector to thereby assume a return to positive voltage essentially instantaneously.

Once the circuitry has been shifted into test mode the three second pulse is applied to both the peak flow memory 13 and to the volume memory 19 through transistor switches Q4 and Q5 which are thereby turned from a nonconductive to a conductive state so that the respective memories are operational. With respect to peak flow memory 13 the output of flow amplifier 4 goes to amplifier 4B and thence through switch Q5 and through a diode CR18 to a memory circuit $S_c$ which is essentially an integrator having an integrating capacitor between its input and output which can be bypassed by reset FET switch Q6. When a positive input appears at terminal 8, on amplifier 4B the output becomes negative into the $S_c$ amplifier making its resultant output go positive. This output is then returned through R52 to the differential input on amplifier 4B to force it to follow the input because of its high gain. This continues until the input becomes more negative than the output in which case the circuit of amplifiers 4B and $S_c$ would normally try to obtain a more negative output from $S_c$ but it is prevented by diode CR18 which serves as a clamp so that the circuit remains at the peak positive value that occured on the input of 4B during the interval that the switch Q5 was closed. The output of the $S_c$ stage goes through a series resistor R60 to the flow meter so that the meter indicates directly the last peak positive value obtained across capacitor C12 and it continues to display that value continuously until the reset button is pressed to short Q6 and remove the last positive values stored on the capacitor C12.

The volume memory circuit 19 is similar to the peak flow memory circuit except for the omission of the function of the diode CR18. Thus, the integrated output of operational amplifier 5A is applied to the input of amplifier 5B of the memory circuit which is turned into test mode through switching transistor Q4 into its conductive state. A positive going signal appearing at the signal input gate of amplifier 5B is similarly developed into a positive signal at the output of operational amplifier $S_b$ and is maintained at instantaneous values through the gain of the combined circuit and the feedback loop including resistor R46. The volume values appearing across amplifier $S_b$ are stored in capacitors C14, C15 and C16 which serve to remember the respective values of the integrated volume over half second, 1 second, and 3 second intervals respectively. Each of these capacitors is reset by shunt field effect transistors Q7, Q8 and Q9 respectively which discharge the capacitors when the remembered value is to be erased. In addition, three switches Q10, Q11 and Q12 connect or disconnect the respective capacitor memory in accordance with the selected timing switch signal. When a test is performed, the timing circuits 18 generate a one-half second, 1 second and 3 second timing pulse, all starting at the initial time zero. These three output pulses are applied to the switching field effect transistors Q11, Q12 and also to a logic circuit consisting of transistor Q13 so as that during the 3 second timing interval Q10 is off for the full 3 seconds overriding the logic Q13. The operation of this memory circuit is therefore as follows: During the first half-second Q10, Q11 and Q12 are all conducting and all three condensers C14, C15 and C16 become charged to the current value at the input of the amplifier 5B. At the end of one-half second Q12 disconnects or opens and the charge on condenser Q16 remains unchanged from then on. For the next half-second or total of one second from the beginning, Q11 remains closed and condensers Q14 and Q15 proceed to be charged on to the current by the use of the input of 5B. At the end of one second Q11 opens and the charge on Q15 remains the same while for the next two seconds or for a total of three seconds from the beginning, Q10 conducts and the charge on Q14 follows the input of operational amplifier 5B. At the end of 3 seconds, input switch Q4 opens allowing no additional input current to the memory circuit and therefore no further change in the charge of any of the memory condensers. By utilizing this circuit three different values of the input function of volume are remembered while utilizing a single high gain amplifier 5B and one memory amplifier $S_b$ instead of duplicate amplifiers and integrating circuits for each function. When the outputs are to be read out the switches Q10, Q11 or Q12 are turned on one at a time by the action of the respective switch, accessible to the operator of the instrument so that the respective value is applied to the volume meter. During the test operation itself, the volume meter is directly connected to the output of the flow integrator circuit 5A previously described at connection C. Therefore, while the test is being performed the meter shows the current integrated volume at the end of the test each of the desired integrated intervals can be selected for application to the meter for readout.

For certain patients having severe obstruction it may not be possible to get essentially all of their air out within the 3 second interval. In this situation it is desirable to extend the test for a duration of 10 seconds. The means for extending the test utilizes the resistors R90 and R91, which are normally shorted out by the three second switch through connections G and H. Consequently, when the 3 second switch is not depressed, the return resistor R96 is 22 megohms which in combination with the 0.3 $\mu$F condenser makes the timing interval approximately the desired 3 seconds. However, if the test switch and the 3 second switch are simultaneously depressed, then the additional resistances R90 and R91 are returned to the circuit by opening the connection between the terminals G and H. This additional resistance is sufficiently large to make the timing interval 10 seconds, and the entire instrument then operates over the longer 10 second interval.

Thus, there has been provided a particularly new and useful spirometer having an improved pneumotach having circuits for developing linear signal as a function of flow through the pneumotach and for normalizing the flow signal in accordance with age, sex and size for the patient to thereby give the output readings for the patient maximum vital capacity and peak expiration flow which are immediately useful and require no further interperative computations; in addition, the circuit is automatically self-zeroing before the patients test begins, is self-starting in response to the patients breathing into the pneumotach, and is self-stopping at the end of a predetermined time interval. The instrument also provides multiple memory storage of integrated volume for predetermined intervals.

To those skilled in the art which pertains, many modifications and variations of the invention will occur. Thus, for example, many of the particular circuit configurations utilized in the present invention to obtain the desired functions may be modified or replaced with equivalent circuits of different design but serving the same or similar function. Such modifications and substitutions should be considered within the scope of the present invention since the specific circuitry disclosed herein for carrying out the invention is by way of example only, and is not to be taken in a generally limiting sense. Thus, the scope of the present invention is to be understood by reference to and interpretation of the accompanying claims.

I claim:

1. A spirometer comprising a pneumotach tube including a screen disposed across the area of said tube for developing a differential pressure thereacross in response to a patient's exhalation applied through said tube, sensing means connected to said tube on each side of said screen to develop an electrical signal indicative of said differential pressure, a non-linear amplifier means constructed and arranged to receive and modify the electrical signal from said sensing means so as to develop a second electrical signal indicative of flow and linearly related to flow through said tube, a normalizing circuit means connected to receive the output of said second electrical signal for developing a normalized value for said linearized flow signal based upon the size, age and sex of the patient such that subsequently developed values of the electrical signal indicative of the maximum expiration flow rate and the forced vital capacity of the patient are ratioed with the expected maximum flow rate and expected forced vital capacity to develop said normalized values; flow display means for sensing and storing peak normalized flow data and including means for supplying an output display thereof visible to the patient, flow integrating and volume memory means for obtaining normalized maximum volume means for supplying an output display thereof visible to the patient, said last named means being independent of said flow display means, a timing circuit means for developing at least one timing pulse of a predetermined duration for controlling the period of operation of each of said flow sensing and storing means and said flow integrating and volume memory means, an auto-zeroing circuit means including an amplifier means having a first state for developing a signal for maintaining the integrating means and display output at a zero level and a second state for holding the last value of said first state in response to a predetermined signal, a starting circuit means responsive to initial exhalation of the patient to switch said auto-zeroing circuit from said first state to said second state and for initiating the beginning of said timing pulse.

2. A spirometer comprising a breath tube including a screen for developing a differential pressure thereacross in response to a patient's exhalation applied through said tube, sensing means connected to said tube on each side of said screen to develop an electrical signal indicative of said differential pressure and said flow, a non-linear amplifier means constructed and arranged to receive and modify the electrical signal from said sensing means so as to develop a second electrical signal indicative of said flow which is linearly related to flow through said tube, a normalizing circuit means connected to receive the output of said second electrical signal and for developing a normalized signal for said linearized flow signal based upon the physical parameters of the patient, flow indicating means for sensing and storing peak normalized flow data and including means for developing an output display visible to the patient, flow integrating and volume memory means for obtaining normalized maximum volume and including means for developing an output display visible to the patient, timing circuit means for developing at least one timing pulse of a predetermined duration for controlling the period of operation of each of said flow sensing and storing means and said flow integrating and volume memory means, and trigger means responsive to the initial exhalation of the patient to start said timing circuit.

3. A spirometer as in claim 2 in which said timing circuit means includes means for developing a plurality of timing signals of progressively longer intervals and in which said volume memory includes means responsive to said timing signals for integrating the instantaneous normalized flow signal over each of said respective intervals.

4. A spirometer comprising pneumotach having sensing means for developing an electrical signal proportional to flow normalizing circuit means, indicating means for sensing and storing peak normalized flow data and including means for supplying an output thereof, flow integrating and memory means for obtaining maximum volume and including means for supplying an output thereof, a timing circuit means for developing at least one timing pulse of predetermined duration for controlling the period of operation of each of said flow sensing and storing means and said flow integrating and memory means, and an auto-zeroing circuit means connected across said flow integrating means and including an amplifier means switchable between a first state for adjusting the output of said integrating means to a zero level and a second state for holding the last value of said first state in response to a predetermined signal, a starting circuit means responsive to initial exhalation of the patient to switch said auto-zeroing circuit from said first state to said second state.

* * * * *